United States Patent [19]

Isono

[11] Patent Number: 4,829,435
[45] Date of Patent: May 9, 1989

[54] SYSTEM FOR CONTROLLING AUTOMATIC VARIABLE SPEED TRANSMISSION

[75] Inventor: Nobuyuki Isono, Toyota, Japan

[73] Assignee: Aisin Seiki Kabushikikaisha, Aichi, Japan

[21] Appl. No.: 26,807

[22] Filed: Mar. 17, 1987

[30] Foreign Application Priority Data

Mar. 17, 1987 [JP] Japan .................................. 61-58824

[51] Int. Cl.[4] ...................... G06F 15/20; B60K 41/08; B60K 41/26
[52] U.S. Cl. ................................... 364/424.1; 74/866; 192/4 A
[58] Field of Search ............... 364/424.1; 74/866, 867, 74/869; 192/0.033, 0.076, 4 A

[56] References Cited

U.S. PATENT DOCUMENTS

| | | | |
|---|---|---|---|
| 4,314,340 | 2/1982 | Miki et al. | 364/424.1 |
| 4,335,428 | 6/1982 | Miki et al. | 364/424.1 |
| 4,354,236 | 10/1982 | Miki et al. | 364/424.1 |
| 4,365,526 | 12/1982 | Suga et al. | 74/866 |
| 4,473,882 | 9/1984 | Suzuki et al. | 192/0.033 |

Primary Examiner—Parshotam S. Lall
Assistant Examiner—V. N. Trans
Attorney, Agent, or Firm—Sughrue, Mion, Zinn, Macpeak & Seas

[57] ABSTRACT

A control system for an automatic variable speed transmission accesses reference data for a down/up shift operation stored in a memory as a function of a particular speed range and a throttle opening. The data read from the memory is compared against a prevailing vehicle speed to determine the need for a down/up shift operation. The reference data includes a first set which is used for determining the need for a down/up shift operation, and a second set which is used in determining the need for a down shift operation when a rapid braking action is applied. When a brake pedal is depressed and the deceleration of the vehicle exceeds a given value, the need for a down operation is determined only utilizing the second set until the brake pedal is released, thus allowing the transmission to shift down to a lower speed range at a relatively higher vehicle speed.

4 Claims, 9 Drawing Sheets

SYSTEM FOR CONTROLLING AUTOMATIC VARIABLE SPEED TRANSMISSION

FIELD OF THE INVENTION

The invention relates to a control system which automatically controls an automatic variable speed transmission onboard a vehicle, and in particular, to an electronic control system which determines a proper speed range on the basis of the current speed range of the transmission, a throttle opening of an onboard engine and a vehicle speed and which energizes or deenergizes solenoid valves included in a hydraulic circuit of the transmission so as to establish the determined speed range.

PRIOR ART

A control system of the kind described is disclosed in U.S. Pat. Nos. 4,314,340, 4,335,428, 4,354,236, and 4,393,467 issued to Nobuaki Miki et al. The control systems disclosed in these prior patents comprises a transmission mechanism including a torque converter, a directly coupled clutch, an overdrive mechanism and a change gearing, and an oil pressure circuit which drives various elements of the transmission mechanism in order to determine a particular speed range of the transmission. The oil pressure circuit includes a pair of solenoid valves which determine a speed range, and a single lockup solenoid valve which establishes a locked/unlocked condition of the directly coupled clutch.

Figure 10A:
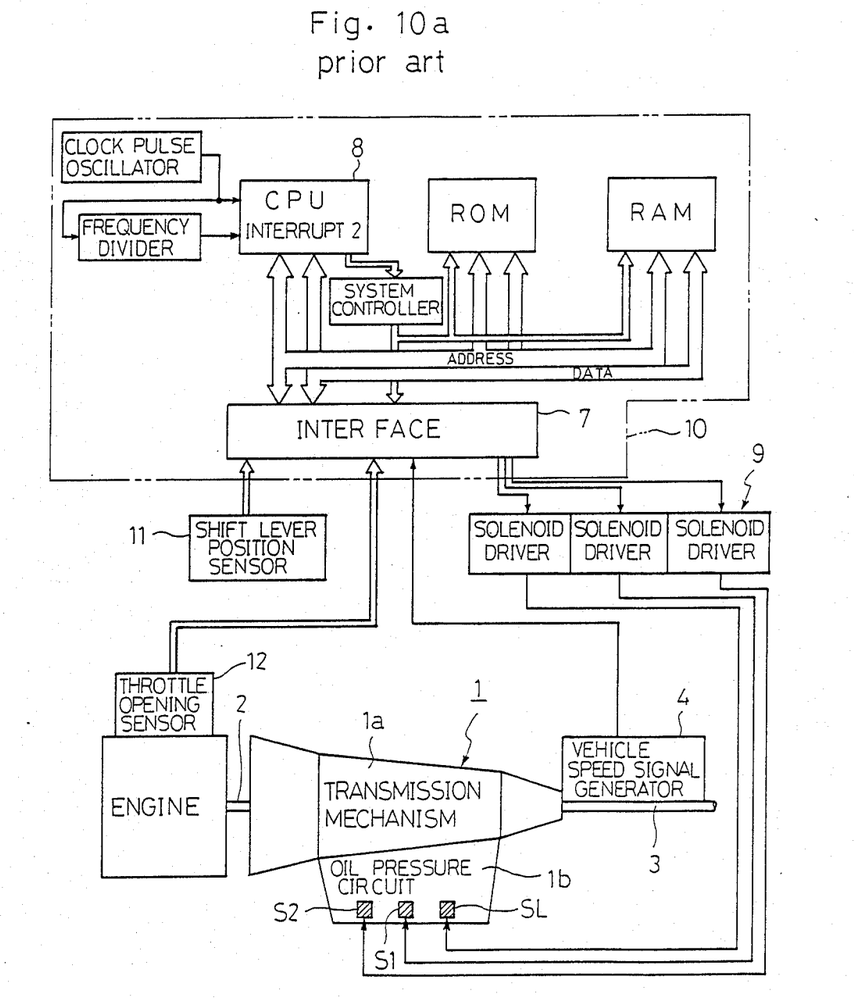
FIG. 10a is a block diagram of a conventional system for controlling an automatic variable speed transmission.

Referring to FIG. 10a, there is shown an exemplary control system of the prior art which is similar to the one disclosed in cited U.S. Pat. No. 4,335,428. In the automatic variable speed transmission shown in FIG. 10a, a gear ratio of a transmission mechanism 1a is determined in accordance with the energization/deenergization of solenoid valves S1, S2 of an oil pressure circuit 1b as indicated in Table 1 below.

TABLE 1

| Speed range (gear ratio) | S1 | S2 |
|---|---|---|
| 1st speed range | on | off |
| 2nd speed range | on | on |
| 3rd speed range | off | on |
| 4th speed range | off | off |

*on: "energization", and off: "deenergization".

Figure 10B:
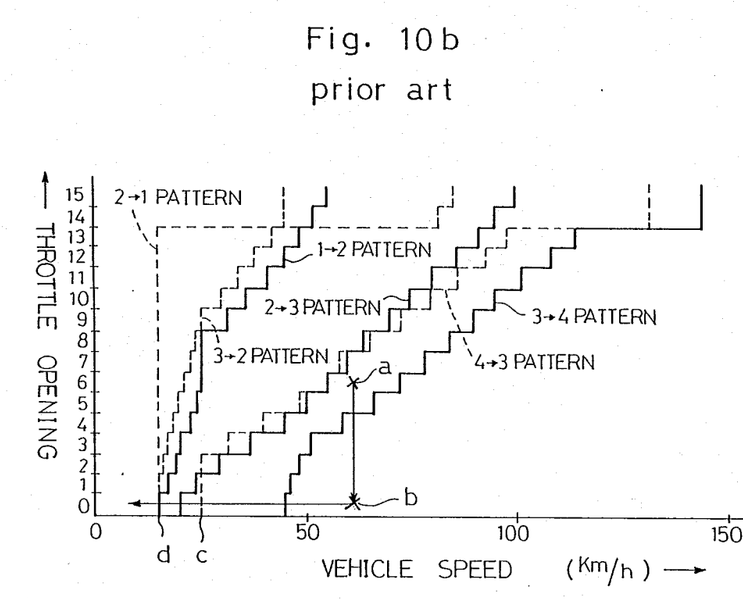

An electronic control system 10 determines the need for an up/down shift between speed ranges on the basis of gear ratio change reference data illustrated in FIG. 10b. Specifically, when the current speed range represents the first speed range, the control system 10 selects a reference value or vehicle speed on a "1→2 PATTERN" shown in FIG. 10b which corresponds to a current throttle opening. It then compares the selected vehicle speed against the current vehicle speed, and if the latter is equal to or greater than the former, the need of an up shift to the second speed range is determined. Similarly, when the vehicle is currently in the second speed range, the control system selects reference values on "2→1 PATTERN" and "2→3 PATTERN" which correspond to the current throttle opening. By comparing the selected reference values against the current vehicle speed, the need of a down shift to the first speed range is determined if the current vehicle speed is equal to or less than the reference value selected from "2→1 PATTERN". In the similar manner, the need of an up shift to the third speed range is determined if the current vehicle speed is equal to or greater than the reference value selected from the "2→3 PATTERN". In response to the next speed range to be established (for example, the third speed range) which is determined as a result of the described process, the control system 10 sets the solenoid valves for energization or deenergization in a manner as indicated in Table 1 given above (S1: off, S2: on). A group of data such as "2→1 PATTERN" shown in FIG. 10b is stored in ROM (read only memory), and after the power supply to the control system 10 is turned on, the latter reads such data from ROM and stores it in RAM (random access memory) for subsequent use in the determination of a particular speed range to be established next. At such time, the control system specifies a particular group or groups of data ("2→1 PATTERN" and "2→3 PATTERN") which correspond to the current speed range (for example, the second speed range), and also specifies and reads a particular reference value in the particular group which corresponds to the current throttle opening.

Each of the speed ranges has associated therewith a pair of predetermined minimum speed and maximum speed at which the directly coupled clutch is to be activated (lockup) and deactivated (unlock), respectively, in a manner corresponding to each of throttle openings. Such data is stored in ROM in a similar manner to groups of data, which representing reference values used to determine the required shift operation and illustrated in FIG. 10b. When the power supply to the system 10 is turned on, such data is also written into RAM for later use in the decision of the need to activate a lockup. At such time, if the lockup is currently established, the control system 10 reads the maximum vehicle speed while it reads the minimum speed if the transmission is unlocked, and by comparing data read against the current vehicle speed, it determines the need to deactivate (unlock) or activate the lockup. In the event the need for the lockup is determined, the control system energizes a solenoid valve SL while it deenergizes the solenoid valve SL if the need to unlock is found.

It will be understood that when the vehicle is to be braked rapidly, a driver of the vehicle releases an accelerator pedal and depresses a brake pedal strongly. It is desirable that the automatic variable speed transmission 1 be shifted down quickly when a rapid braking is desired. Where an engine brake is inoperable in one or more speed ranges of the transmission 1, it is desirable that a down shift to a lower speed range in which the engine brake is effective be rapidly established. The engine brake is then effective to reduce the vehicle speed rapidly, in particular, in a lower speed range.

Returning to FIG. 10b, let us assume that the vehicle is running at a speed of 60 km/h in the third speed range with a throttle opening of 6 (corresponding to point a in FIG. 10b), by way of example. If a driver of the vehicle performs a rapid braking action by releasing the accelerator pedal and depressing the brake pedal, the throttle opening will change to 0 (idling opening), whereby an up shift to the fourth speed range (to point b shown in FIG. 10b) will be required. Accordingly, the control system 10 shifts up the transmission 1 to the fourth speed range at point b. Subsequently, when the vehicle speed has been lowered to a value corresponding to point c, the control system 10 shifts down from the fourth to the third speed range and subsequently when the vehicle speed has been further lowered to a value corresponding to point d, it shifts down from the third to the second and then from the second to the first speed range. In this manner, the control system 10 performs a shifting operation which cycles to the third, the fourth, the third, the second and the first speed range sequentially. It will be noted that such shifting operation results in a retarded effectiveness of the engine brake. The effectiveness of the engine brake will be further retarded if a speed range in which the engine brake is ineffective is located somewhere among these speed ranges (from the first to the fourth speed range).

SUMMARY OF THE INVENTION

It is a first object of the invention to provide an improved control system for an automatic variable speed transmission, and a second object to provide a control system which makes an engine brake to be effective upon a vehicle as rapidly and strongly as possible in response to a rapid braking action applied by a driver.

The above objects are accomplished in accordance with the invention by providing an electronic control system comprising memory means which store first gear ratio change reference data which is used as a basis to determine an up/down shift of an automatic variable transmission, and second gear ratio change reference data which is used as a basis to determine a down shift of the transmission when a rapid braking action is applied to a vehicle and which causes a down shift at a vehicle speed higher than that where the down shift would occur on the basis of the first reference data. The control system also comprises means for detecting a rapid braking action applied to a vehicle. When the latter means has detected the application of a rapid braking action, the need for a down shift is determined on the basis of the second reference data, and a down shift operation takes place when such need is determined. The first reference data includes a minimum vehicle speed for an up shift and a maximum vehicle speed for a down shift, both of which is specified by a speed range and a throttle opening while the second reference data only includes a maximum vehicle speed for a down shift which is specified by only the speed range. For a same speed range, the maximum speed for the down shift operation included in the second reference data is higher than the maximum vehicle speed for a down shift operation which is included in the first reference data. Accordingly, when a rapid braking action is applied to a vehicle, the transmission rapidly shifts down without going through an up shift operation, whereby the engine brake is rapidly applied to the vehicle in an enhanced manner.

Other objects and features of the invention will become apparent from the following description of embodiments thereof with reference to the drawings.

BRIEF DESCRIPTION OF THE DRAWINGS

FIG. 10b graphically illustrates gear ratio change reference data which is stored in ROM shown in FIG. 10a.

DESCRIPTION OF PREFERRED EMBODIMENTS

Figure 1:
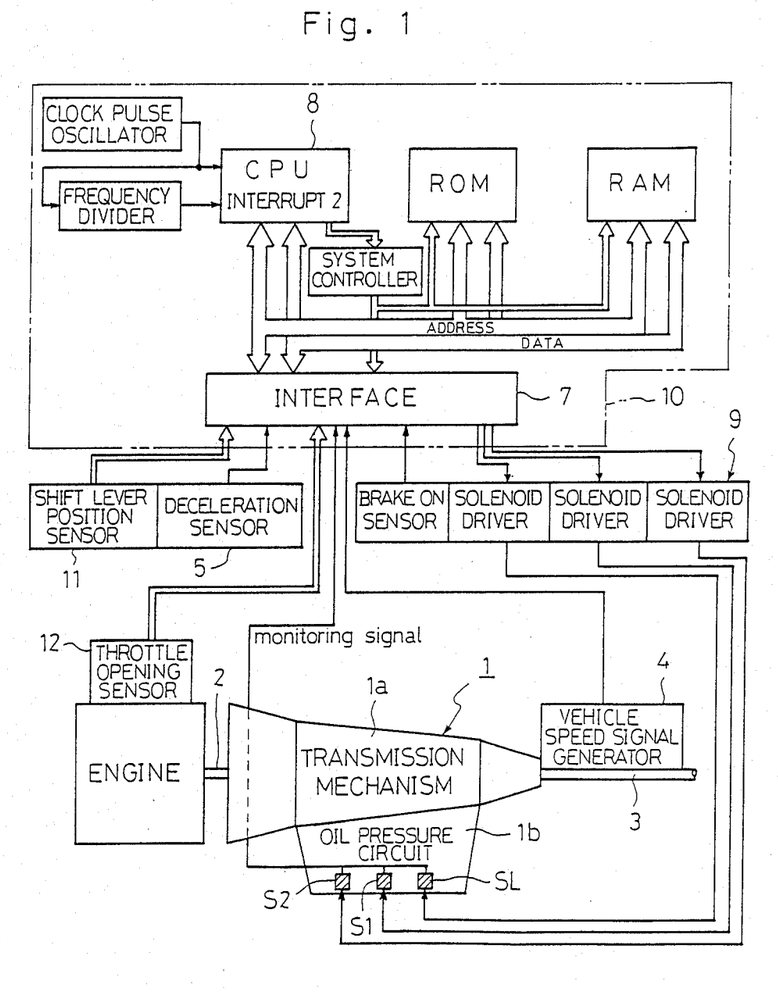
FIG. 1 is a block diagram of a first embodiment of the invention.

Referring to FIG. 1 which shows a first embodiment of the invention, an automatic variable speed transmission 1 shown is generally arranged in the same manner as that shown in FIG. 10a and which establishes a particular speed range in accordance with the Table 1 in response to the energization/deenergization of solenoid valves S1 and S2. In FIG. 1, a transmission mechanism 1a includes an input shaft which is coupled to the output shaft of an onboard engine. The transmission mechanism 1a includes an output shaft 3 which drives wheels for rotation and on which a vehicle speed signal generator 4 is mounted. The generator 4 produces one pulse signal in response to the rotation of the output shaft 3 through a given incremental angle. This pulse signal is fed through an interface 7 to a first interrupt port of CPU 8. A throttle opening sensor 12 is mounted on the rotary shaft of a throttle valve contained within the engine, and develops a three bit opening data which represents a decimal number from 0 to 7. When the throttle opening indicates an idling condition, the sensor 12 develops data representing decimal 0 while when the throttle opening is at its maximum, the sensor develops data representing decimal 7. The opening data is also fed through the interface 7 to CPU.

A shift lever position sensor 11 detects the position of a shift lever which drives a shift valve disposed in an oil pressure circuit 1b, and develops data representing such position. Such data is also fed through the interface 7 to CPU 8. A brake on sensor 6 develops a brake on signal when a brake pedal (not shown) is positioned so as to produce a braking pressure, and this signal is also fed through the interface 7 to CPU 8. A deceleration sensor 5 develops a rapid braking detection signal when the deceleration of a vehicle is equal to or greater than 0.5 G, or when $dV \leq 0.5$ G where dV represents either acceleration when it is positive or deceleration when it is negative. This detection signal is also fed through the interface 7 to CPU 7. A clock pulse oscillator produces a pulse which is directly applied to a clock input of CPU 8 and is also supplied to a frequency divider which divides the clock frequency before applying it to a second interrupt port of CPU 8. CPU 8 produces signals which command the energization/deenergization of solenoid valves S1, S2 and SL, delivering these signals to solenoid drivers 9. In response to such signal, each of the solenoid drivers 9 operates to either energize or deenergize an associated solenoid valve S1, S2 or SL.

Each of the solenoid valves is connected to a signal line which senses the energization or deenergization of the associated valve to provide a signal representing such condition which is in turn fed through the interface 7 to CPU 8.

The electronic control system 10 includes a read only memory ROM which stores programs for effecting a control operation to be described later, first gear ratio change reference data shown in FIG. 2 and second gear ratio change reference data shown in FIG. 3. The first gear ratio change reference data is similar to a conventional one shown in FIG. 10b. The second gear ratio change reference data includes only three data $PB_{21}$, $PB_{32}$ and $PB_{43}$ which are independent from the throttle opening. It will be noted that $PB_{21}$, $PB_{32}$ and $PB_{43}$ which are used as a basis to determine the need for a down shift to the first speed range from the second speed range, to the second from the third, and to the third from the fourth speed range, respectively, represent vehicle speeds far greater than corresponding values contained in the first gear ratio change reference data shown at c, d and e, respectively. The program data, and the first and the second gear ratio change reference data are read out from ROM and stored into RAM immediately after the power supply to the control system 9 is turned on.

Figure 4:
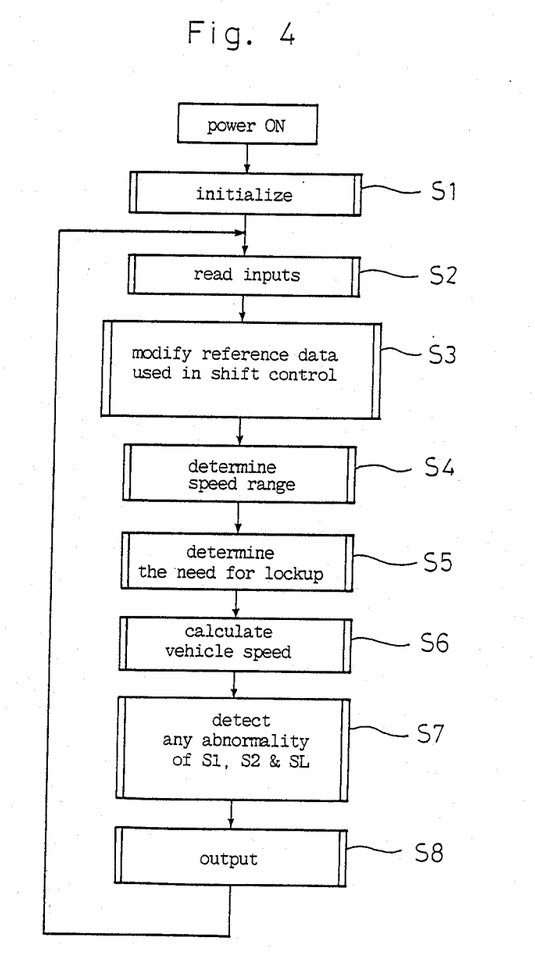
FIG. 4 is a flowchart of a main routine of a control operation by CPU shown in FIG. 1.

FIG. 4 generally illustrates a main routine of a control operation by CPU 8 which takes place in accordance with the program data. When the power supply is turned on, CPU 8 is initialized (S1), thus initializing the interface 7, the solenoid drivers 9 as well as internal registers, counters and timers which are disposed within CPU 8. In a next subroutine S2, CPU 8 reads inputs and store them into internal registers. Specifically, position data from the sensor 11 is written into a shift lever position register; a signal developed by the sensor 5 (L: rapid braking, H: normal) is written into a deceleration register; data from the sensor 12 is written into a throttle opening register; a monitor signal from the circuit 1b is written into a solenoid monitor register; and a signal from the sensor 6 (L: brake on, H: brake off) is written into a brake register. In a next subroutine S3, controlling reference data such as first gear ratio change reference data is modified in a manner dependent on a running load and the shift lever position; the modification which takes place at this subroutine is disclosed in detail in U.S. Pat. No. 4,335,428, which is cited herein for purpose of reference.

Figure 5:
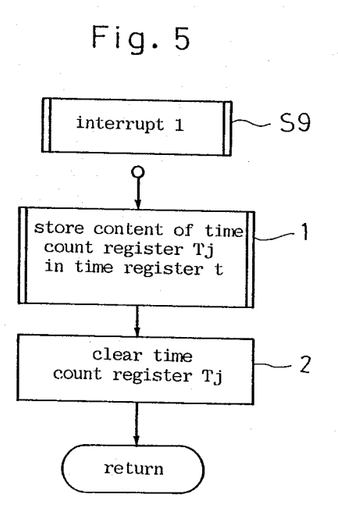
FIGS. 5, 6 and 7 are flowcharts of subroutines used in the control operation by CPU shown in FIG. 1.

In a following subroutine S4, a gear ratio or speed range is determined on the basis of the throttle opening which is read at subroutine S2, a vehicle speed which is already calculated at vehicle speed calculating subroutine S6, to be described later, and stored in a vehicle speed register, and the reference value which has been modified at the subroutine S3, and writes the resulting gear ratio into an output register. The detail of the subroutine S4 will be described later with reference to FIG. 6. In a following subroutine S5, CPU 8 determines whether the directly coupled clutch is to be locked (to establish a lockup condition), and stores the result of decision into an output register. The detail of such decision is described in detail in U.S. Pat. No. 4,393,467, which is cited for reference. In a following subroutine S6, a vehicle speed is calculated for storage in a vehicle speed register on the basis of the period t with which pulses are produced by the generator 4 and which is detected by an interrupt processing subroutine S9 (FIG. 5), which will be described later.

Subroutine S7 deals with a decision of presence of any abnormality such as a breakage or short-circuit of wires in the solenoid valves and the solenoid drivers 9, by comparing the potential (H: energized, L: deenergized) on an electric lead connected to the positive terminal of an electrical coil associated with each of the solenoid valves S1, S2 and SL in the oil pressure circuit 1b against a corresponding energization signal stored in the output register. If the presence of some abnormality is found, the fourth speed range and "directly coupled clutch off" (unlock) are written into the output register, thus deenergizing the solenoid valves S1, S2 and SL. In a following subroutine S8, control signals which are stored in the output register, namely, a speed range designating signal (which designates the on/off condition of the solenoid valves S1 and S2) which has been determined at the subroutine S4 and a lock/unlock signal (which specifies the on/off condition of the solenoid valve SL) which has been determined at subroutine S5 are latched in output ports. In the event an abnormality is detected at the subroutine S7, the speed range designating signal will designate the fourth speed range, which turns the solenoid valves S1 and S2 off.

The pulse which is produced by the vehicle speed signal generator 4 coupled to the output shaft of the transmission mechanism 1a is fed to the first interrupt port of CPU 8. Each time the pulse is applied, CPU 8 executes an interrupt 1 subroutine S9 shown in FIG. 5. Specifically, in response to the application of a single pulse to the first interrupt port, the content of a time count register Tj which counts the pulses produced by the clock pulse oscillator (FIG. 1) is written into a time register t (step 1), while clearing the time count register Tj (step 2), whereupon the program returns to the main routine. The time count register Tj also counts the pulse produced by the oscillator. Since the subroutine S9 is executed each time a single pulse is produced by the generator 4, it follows that the content of the time register t represents the period of pulses produced by the generator 4. In the subroutine S6 shown in FIG. 4, the content of the time register t is utilized to calculate a vehicle speed $V = D_c/t$ where $D_c$ represents a constant, and the vehicle speed V is used to update a vehicle speed register V. In this manner, the vehicle speed register V always stores data representing a vehicle speed, which is read out during the subroutines S4 and S5.

Figure 6:
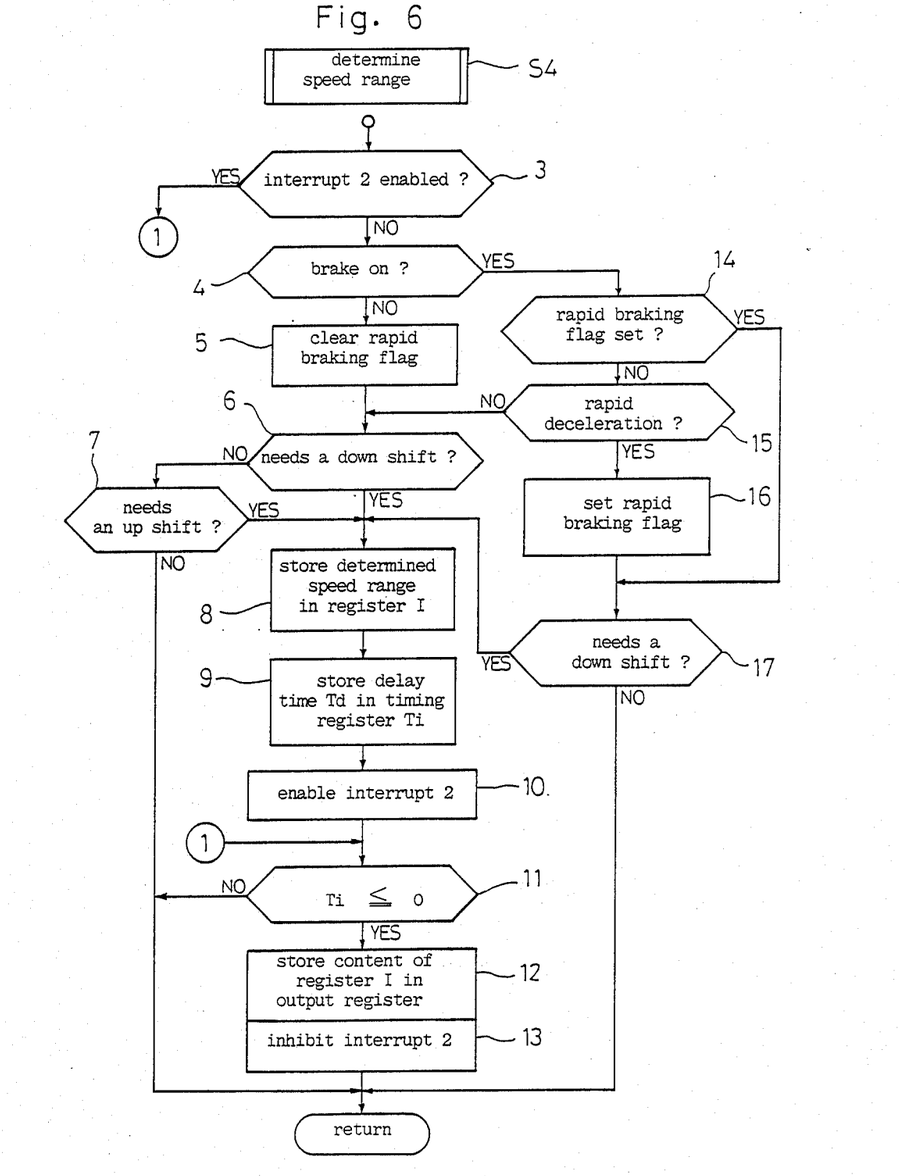

FIG. 6 shows the subroutine S4 shown in FIG. 4 in detail. When the subroutine S4 is entered, CPU 8 initially examines whether an interrupt 2 operation is enabled at step 3. The significance of step 3 will be described later. When the interrupt 2 operation is not enabled, it then examines the content of the brake register to see if there is a brake on condition (step 4). If a brake on condition is found, it clears a rapid braking flag (step 5) and examines if there is a need for a down shift operation to a lower speed range (step 6). In this process, it searches among the first gear ratio change reference data (FIG. 2) to access data "d" in the minimum vehicle speed group ("3→2 PATTERN - $PN_{32}$") corresponding to the current speed range (for example, the third speed range) which is stored in the output register and which also corresponds to the current throttle opening (namely, the content of the throttle opening register which may be "1", for example) from RAM, and then compares the data "d" against the content V of the vehicle speed register V. If $V \leq$ "d" is found, this means that there is a need for a down shift operation, and accordingly, a speed range which is one level lower (or the second speed range) is written into a register I (step 8). If V>"d", a decision is made to see if there is a need to effect an up shift operation (step 7). In this decision, a search among the first gear ratio change reference data (FIG. 2) is made to access data (110 km/h) corresponding to the maximum vehicle speed group ("3→4" PATTERN - $PN_{34}$) corresponding to the current speed range (for example, the third speed range) and which also corresponds to the current throttle opening (for example, "5"), and such data is read out from RAM and compared against the content of the vehicle speed register V. If it if found that V≧110 km/h, there is a need for an up shift operation, and hence a speed range which is one level higher (thus, the fourth speed range) is written into the register I (step 8). If V<100 km/h, there is no need to change the speed range, and the program returns to the main routine at subroutine S5.

When the need for a down or an up shift operation is found and a target speed range which is to be established next is stored in the register I (step 8), a time delay Td which is used to minimize shocks which may be imparted to the transmission mechanism 1a as a result of a shifting operation is stored in a timing register Ti (step 9), and an interrupt 2 operation is enabled (step 10). The content of the register Ti is examined to see if it is equal to or less than 0 or whether Ti has passed (step 11), and unless it is equal to or less than 0, the program returns to the main routine. When the subroutine S4 is again entered after the execution of other processing operations in the main routine, the interrupt 2 operation is enabled at this time, waiting for the delay time Td to pass, and hence the program jumps from step 3 to step 11 in FIG. 6, examining whether the content of register Ti is equal to less than 0.

Figure 7:
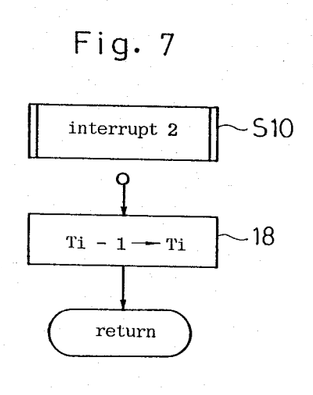

Referring to FIG. 7, the interrupt 2 operation will be described. When the interrupt 2 operation is enabled, CPU 8 executes the subroutine S10 shown in FIG. 7 each time the frequency divider (FIG. 1) produces a single pulse, by decrementing the timing register Ti by one (step 18), whereupon the program returns to the main routine or subroutine which immediately precedes the occurrence of the interrupt 2. Accordingly, when the interrupt 2 operation is enabled, the content of the timing register Ti is decremented by one with the period with which the pulse is produced by the frequency divider. Returning to FIG. 6, when it is found at step 11 that the content of the timing register Ti is equal to or less than 0, the content of the register I is stored in the output register (step 12) and the interrupt 2 operation is inhibited (step 13), whereupon the program returns to the main routine. The speed range data which is stored in the output register is latched at the output port during the subroutine S8, whereby the transmission shifts down from the third to the second speed range or shifts up from the third to the fourth speed range, for example.

When the brake pedal, not shown, is depressed, and CPU 8 has stored "brake on" into the brake register and stores the signal detected by the sensor 5 (L: rapid braking, H: normal braking) into the deceleration register and the program has proceeded to the subroutine S4, the program then proceeds from step 4 to step 14 in FIG. 6 where the rapid braking flag is examined to see if it is set or not. If the flag is not set, the content of the deceleration register is examined (step 15). If the deceleration register has a content of L level (rapid braking), the rapid braking flag is set (step 16), and a decision is made to see if there is a need for a down shift operation (step 17).

This decision is rendered by searching among the second gear ratio change reference data (FIG. 3) to access the minimum vehicle speed data "4→3 PATTERN - $PB_{43}$" therefrom, which corresponds to the current speed range stored in the output register (for example, the fourth speed range). This data is read from RAM and is compared against the content of the vehicle speed register V. If V≦$PB_{43}$, this means a need for a down shift operation. Accordingly, a speed range which is one level lower (the third speed range) is written into the register I (step 8). When the time delay Td has passed after such writing operation, the transmission 1 is changed from the fourth to the third speed range, for example (the program proceeding through step 9 - 10 - 11 - 12 - 13). Subsequently, as long as the brake pedal continues to be depressed, the program proceeds through step 4 - 14 - 17 in the subroutine S4, thus rendering a decision to determine the need for a down shift operation on the basis of the second gear ratio change reference data (FIG. 3). The transmission sequentially shifts down through speed ranges as a result of the braking force and an increase in the effect of the engine brake to reduce the vehicle speed as the transmission shifts down. When the brake pedal is released, the program proceeds from step 4 to step 5 of the subroutine S4 (FIG. 6), and CPU 8 clears the rapid braking flag, and determines the need for a down/up shift operation on the basis of the first gear ratio change reference data (FIG. 2) at steps 6 and 7. It is to be noted that if the brake pedal is depressed, in the absence of "rapid deceleration" detected by the deceleration sensor 5, the program proceeds through step 4 - 14 - 15 - 6 in the subroutine S4, thus determining the need for a down/up shift on the basis of the first gear ratio change reference data (FIG. 2) without setting the rapid braking flag.

Figure 2:
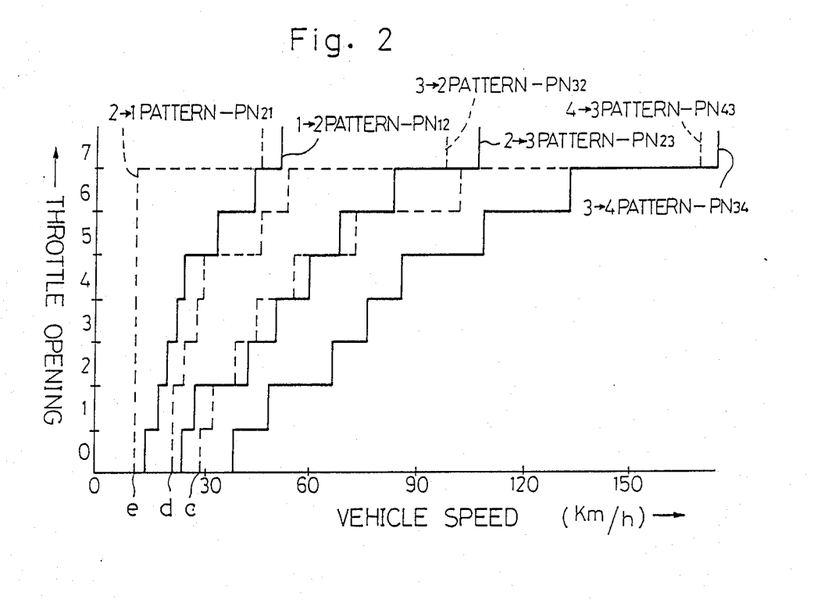
FIG. 2 graphically illustrates first gear ratio change reference data which is stored in ROM shown in FIG. 1.
Figure 3:
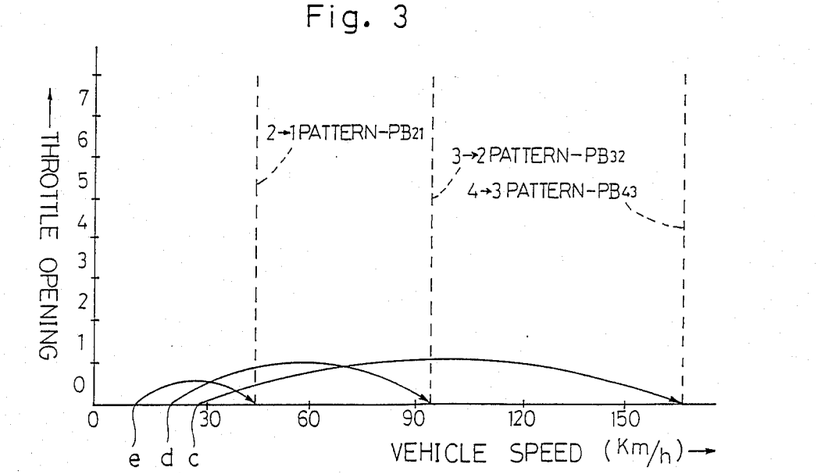
FIG. 3 graphically illustrates second gear ratio change reference data which is stored in ROM shown in FIG. 1.

As shown in FIGS. 2 and 3, second gear ratio change reference data $PB_{43}$, $PB_{32}$ and $PB_{21}$ have values greater than "c", "d" and "e", respectively, of down shift groups $PN_{43}$, $PN_{32}$ and $PN_{21}$ in the first gear ratio change reference data which corresponds to the throttle opening of "0". Accordingly, when a driver of the vehicle has released the accelerator pedal, which causes the throttle opening to be reduced to "0", and then depresses the brake pedal to induce the sensor 5 to detect "rapid deceleration", the transmission 1 shifts down to respective lower speed ranges in a more rapid manner.

Figure 8A:
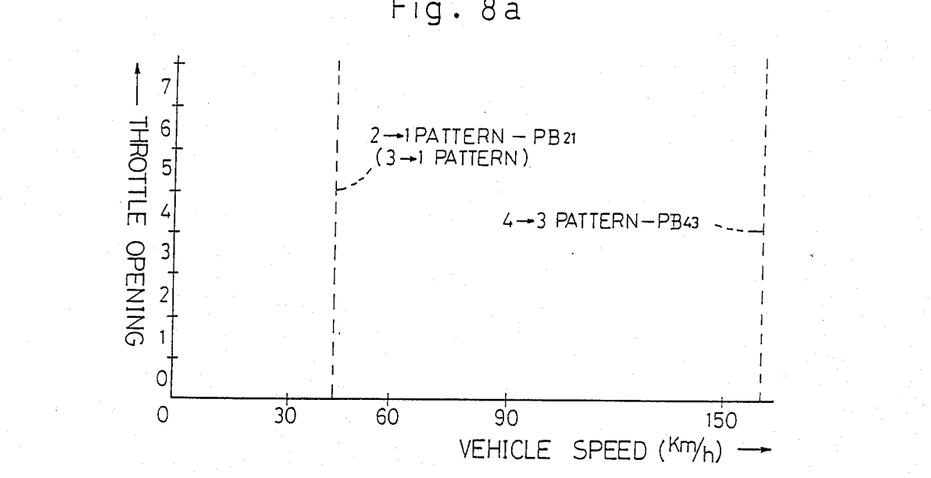
FIG. 8a graphically illustrates second gear ratio change reference data used in a second embodiment of the invention.
Figure 8B:
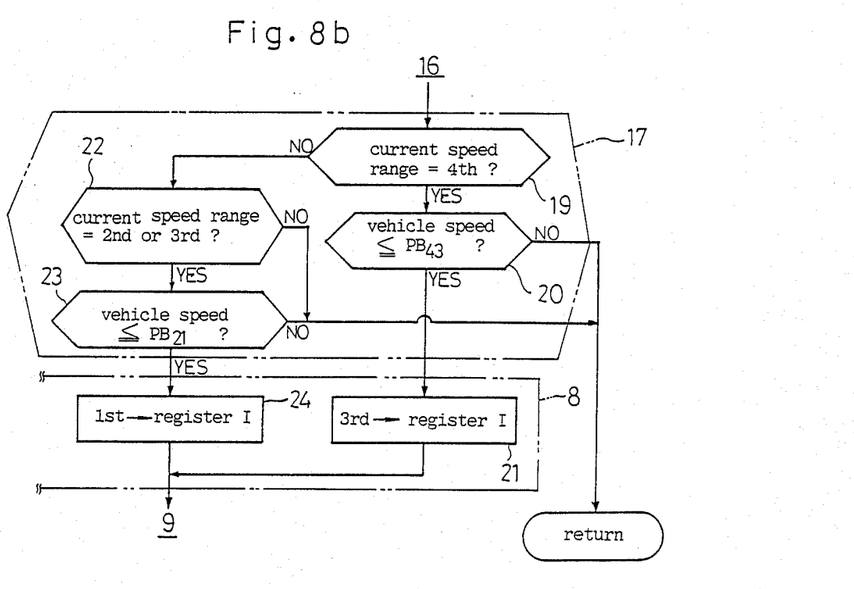
FIG. 8b is a flowchart of part of a subroutine used in the control operation by CPU in the second embodiment.

The transmission 1 shown in FIG. 1 is constructed in a manner such that the engine brake is effective in any of the first to the fourth speed range. However, for an automatic variable speed transmission in which one-way clutch is operated to make the engine brake ineffective in one or more speed ranges, it is preferred that during the rapid braking action, the transmission jumps over a particular speed range or ranges in which the engine brake is ineffective during its down shift operation. Such an arrangement is illustrated as a second embodiment of the invention in FIGS. 8a and 8b. Specifically, FIG. 8a illustrates the second gear ratio change reference data which is used in the second embodiment while FIG. 8b shows a portion of the control operation by CPU in the second embodiment which is modified from that of the first embodiment. It is to be understood that the hardware of the electronic control system used in the second embodiment remains the same as used in the first embodiment.

Referring to FIG. 8b, in the second embodiment, during the decision of the need for a down shift operation under the rapid braking condition (step 17), CPU selects $PB_{43}$ of second gear ratio change reference data (FIG. 8a) if the current speed range is the fourth speed range, or selects $PB_{21}$ if the current speed range is either the third or the second speed range, and reads such data from RAM for comparison against the vehicle speed V. When the current speed range is the fourth and if $V \leq PB_{43}$, the third speed range is selected for storage in the register I while if the current speed range is either the third or the second speed range, and if $V \leq PB_{21}$, the first speed range is selected for storage in the register I (steps 19 to 24). The remaining control operation by CPU in the second embodiment remains the same as in the first embodiment. According to the second embodiment, the down shift operation proceeds in the manner of 4th→3rd→2nd, or 3rd→1st or 2nd→1st if the rapid braking action is applied in the fourth, the third or the second speed range, respectively.

Figure 9A:
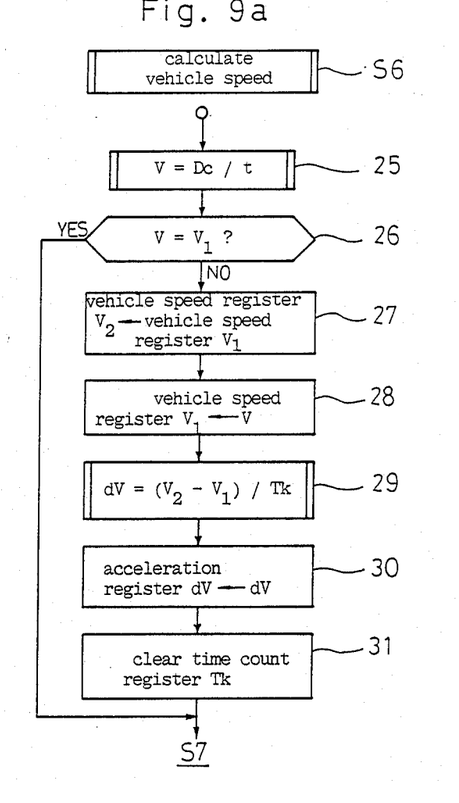
FIG. 9a is a flowchart of a subroutine used in the control operation by CPU in a third embodiment of the invention.
Figure 9B:
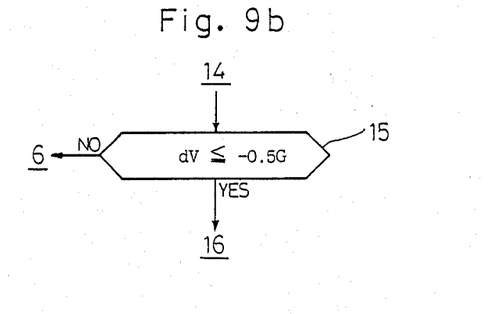
FIG. 9b is a flowchart, representing part of a main routine for a control operation by CPU in the third embodiment.

In the first and the second embodiments described above, "rapid deceleration" is detected by the sensor 5. In a third embodiment of the invention, the sensor 5 is omitted, and is replaced by the functioning of CPU of the electronic control system which detects "rapid deceleration". The hardware of the third embodiment is essentially the same as the first embodiment shown in FIG. 1 from which the sensor 5 is removed. However, in the control operation, the subroutine S6 of the first embodiment is replaced by a subroutine illustrated in FIG. 9a and the step 15 (FIG. 6) of the first embodiment is replaced by that shown in FIG. 9b. Specifically, referring to FIG. 9a, in the third embodiment, CPU (not shown) operates in the vehicle speed calculation subroutine S6 to calculate the vehicle speed V in the same manner as in the first embodiment (step 25). It then examines the calculated vehicle speed V to see if it is equal to the content of vehicle speed register $V_1$ (step 26). If it is unequal, the content of the vehicle speed register $V_1$ is stored in vehicle speed register $V_2$ (step 27) while the calculated speed V is stored in the register $V_1$ (step 28). An acceleration/deceleration dV where a positive value indicates an acceleration while a negative value indicates a deceleration is calculated according to the equation $dV = (V_2 - V_1)/Tk$ (step 29). It will be seen that $V_1$ stands for the content of register $V_1$, $V_2$ stands for the content of register $V_2$, and Tk stands for the content of time count register Tk. The calculated acceleration/deceleration dV is stored in acceleration register dV (step 30), and the time count register Tk is cleared (step 31). The time count register Tk is incremented by one for each pulse produced by the clock pulse oscillator (FIG. 1), and its content at the time when the step 29 is being performed indicates a time interval required for the vehicle speed to change from the value in the register $V_1$ to the value V. As shown in FIG. 9b, the acceleration data dV is compared against a rapid deceleration reference value "−0.5 G" at step 15. If the $dV \leq -0.5$ G, the rapid braking flag is set at the next following step (step 16 in FIG. 6).

As described, the electronic control system of the invention detects that a rapid braking action has been applied. While it normally utilizes reference values in the first gear ratio change reference data in making a decision to determine the need for a down shift operation, when a rapid braking action has been applied and detected, it selects second gear ratio change reference data only including reference values which are used in determining the need for a down shift operation and which causes the down shift operation at a higher vehicle speed than the corresponding reference value in the first data. The need for a down shift operation is made on the basis of reference values in the second data to control the transmission, thereby allowing the engine brake to be effective in a rapid manner when the rapid braking action is applied.

What is claimed is:

1. A system for controlling an automatic variable speed transmission including a transmission mechanism and an oil pressure circuit including solenoid valves for controlling gear ratio of the transmission mechanism, comprising:

solenoid drivers for energizing or deenergizing the solenoid valves;

means for detecting a throttle opening of an onboard engine which drives the input shaft of the transmission mechanism;

means for detecting the speed of a vehicle;

means for detecting the depression of a brake pedal of the vehicle to provide a brake on signal;

means for detecting a rapid deceleration of the vehicle;

and electronic control means including memory means having stored therein first gear ratio change reference data containing minimum vehicle speeds for a down shift operation and maximum vehicle speeds for an up shift operation which are accessed in terms of a particular speed range of the transmission and the throttle opening, and second gear ratio change reference data containing minimum vehicle speeds for a down shift operation which are accessed in terms of only the particular speed range of the transmission, the control means determining a particular speed range to which the transmission is to shift down on the basis of the speed range, the vehicle speed and the second gear ratio change reference data during a time interval from the detection of a rapid deceleration by said means until the detection of a brake off condition when the brake on signal is produced, and on the basis of the speed range of the transmission and the vehicle speed of the first gear ratio change reference data otherwise, the control means providing an energization/deenergization signal to the solenoid drivers for establishing the particular speed range thus determined.

2. A system according to claim 1 in which second gear ratio change reference data has greater values than corresponding values for the down shift operation which are contained in the first gear ratio change reference data.

3. A system for controlling an automatic variable speed transmission including a transmission mechanism and an oil pressure circuit including solenoid valves for controlling the gear ratio of the transmission mechanism, comprising:

solenoid drivers for energizing or deenergizing the solenoid valves;

means for detecting the throttle opening of an onboard engine which drives the input shaft of the transmission mechanism;

means for detecting the speed of a vehicle;

means for detecting the depression of a brake pedal of the vehicle to provide a brake on signal;

and electronic control means including memory means having stored therein first gear ratio change reference data including minimum vehicle speeds for a down shift operation and maximum vehicle speeds for an up shift operation which are accessed in terms of a particular speed range of the transmission and the throttle opening and second gear ratio change reference data including minimum vehicle speeds for a down shift operation which are accessed in terms of only the speed range of the transmission, the control means calculating an acceleration of the vehicle on the basis of the vehicle speed to thereby detect a rapid deceleration of the vehicle, the control means determining a particular speed range to which the transmission is to shift down on the basis of the speed range, the vehicle speed and the second gear ratio change reference data during a time interval from the detection of the rapid deceleration of the vehicle until the detection of a brake off condition by said means when the brake on signal is produced and determining a speed range to which the transmission is to shift down or up on the basis of the speed range of the transmission, the vehicle speed and the first gear ratio change reference data otherwise, the control means providing an energization/deenergization to the solenoid drivers in order to establish the speed range thus determined.

4. A system according to claim 3 in which the second gear ratio change reference data have values greater than corresponding values in the first gear ratio change reference data which are used for a down shift operation.

* * * * *